March 24, 1970 NOBUHARU YAMAUCHI 3,503,068

RANGE TRACKING SYSTEM

Filed Jan. 25, 1968 2 Sheets-Sheet 1

United States Patent Office 3,503,068

Patented Mar. 24, 1970

1

3,503,068

RANGE TRACKING SYSTEM

Nobuharu Yamauchi, Amagasaki, Japan, assignor to Mitsubishi Denki Kabushiki Kaisha, Tokyo, Japan

Filed Jan. 25, 1968, Ser. No. 700,567
Int. Cl. G01s *9/02*

U.S. Cl. 343—7.3 4 Claims

ABSTRACT OF THE DISCLOSURE

Video signals received by a radar apparatus are quantized in range, and a memory stores the quantized signals originating from the respective quantized ranges and throughout a predetermined width of a pulse repetition period of radar pulses involved. The stored signals are utilized to determine the presence or absence of a target. The presence of the target immediately produces a range trigger to effect an angle tracking. On the other hand, a range feedback system produces a range to the target of the radar apparatus identical to the actual range to it which is, in turn, utilized to effect a fine angle tracking.

This invention relates to a range tracking system for use in an acquisition and tracking radar apparatus.

In the conventional type of range tracking systems for use with acquisition and tracking radar apparatus, it has been the practice to sweep a range gate upon an acquisition of a target to seek it. Such systems have difficulty to acquire any target moving at a high speed with a high probability because the target may have passed through the associated antenna beamwidth during the scanning or acquisition operation.

Accordingly it is an object of the invention to provide a new and improved range tracking system for use with an acquisition and tracking radar apparatus capable of rapidly acquiring a target.

It is another object of the invention to provide a range tracking radar system of the type described in the preceding paragraph and including improved means for correcting an error of a range to a target acquired by the radar apparatus.

It is still another object of the invention to provide a new and improved range tracking system including a reversible counter to indicate a range to a target of the associated radar apparatus.

It is another object of the invention to provide a new and improved range tracking system capable of indicating a range to a target of the associated radar apparatus through the use of a resolver as a range feedback system.

With the above cited objects in view, the invention resides in a range tracking system for use with an acquisition and tracking radar apparatus comprising a quantization circuit for quantizing video singals, a memory for storing therein the quantized signals originating from a predetermined zone of quantized ranges and throughout a predetermined width of a pulse recurrence frequency of radar pulses involved, a correlation computer circuit or computing a correlation between the stored signals to defect a range to a target of the radar apparatus, and a tracking gate circuit responsive to the detected range to the target to produce a tracking gating required to perform an angle tracking operation.

The above and other objects of the invention will readily be understood from the following detailed description in conjunction with the accompanying drawings in which.

2

Figure 3:
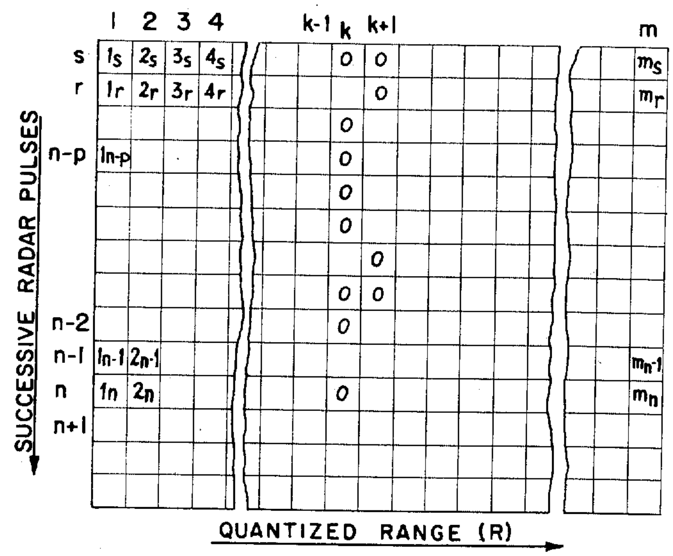
Figure 4:
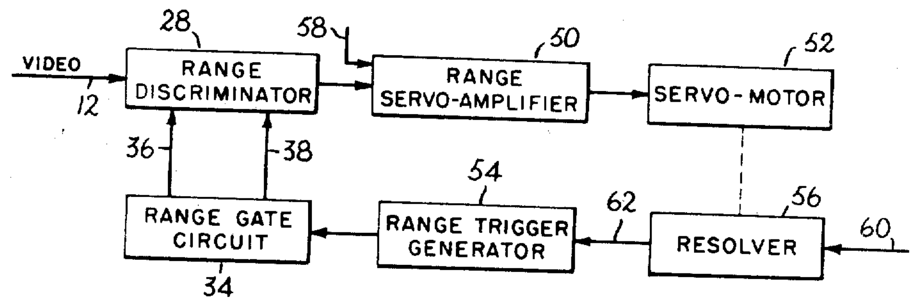
Figure 5:
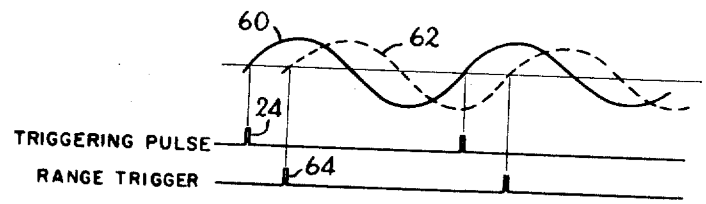
Figure 6:
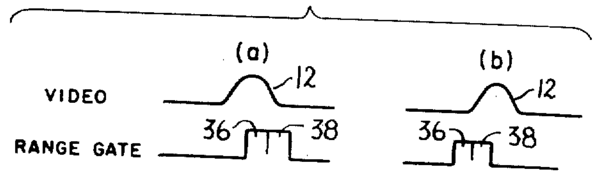

FIGURE 3 is a chart useful in explaining the correlative operation of video signals quantized in accordance with the principles of the invention;

FIGURE 4 is a block diagram of one portion of a modification of the invention; and FIGURES 5 and 6 are waveforms developed at various points on the device shown in FIGURE 4.

According to the fundamental concept of the invention all echoes range information originating from all ranges including a radar range involved are first quantized in range to determine an approximate range to a target of the associated radar apparatus and then an angle tracking is effected for the acquired target while at the same time a range tracking is initiated to accurately measure a range to the target.

This measure permits an acquisition to be rapidly accomplished. In other words, if an interval of time necessary for an acquisition of a target is desired to be shortened according to the prior art practice, it will be required to dispose a multiplicity of range measuring circuits in parallel circuit relationship to decrease a zone of ranges or distances allotted to each of the range measuring circuits. This measure, however, causes the resulting equipment to be actually too large to be realized. The invention contemplates to realize such a measure through the use of a magnetic core type memory. In order to improve accuracy of measurement it is necessary to render a unit of quantization as extremely small, for example less than a tenth of an echo-width. However, the use of such a small unit of range quantization for all ranges including a radar range involved also leads to a large-sized equipment which is not advisable. For the above reason, the invention has been incorporated in a tracking radar system.

Figure 1:
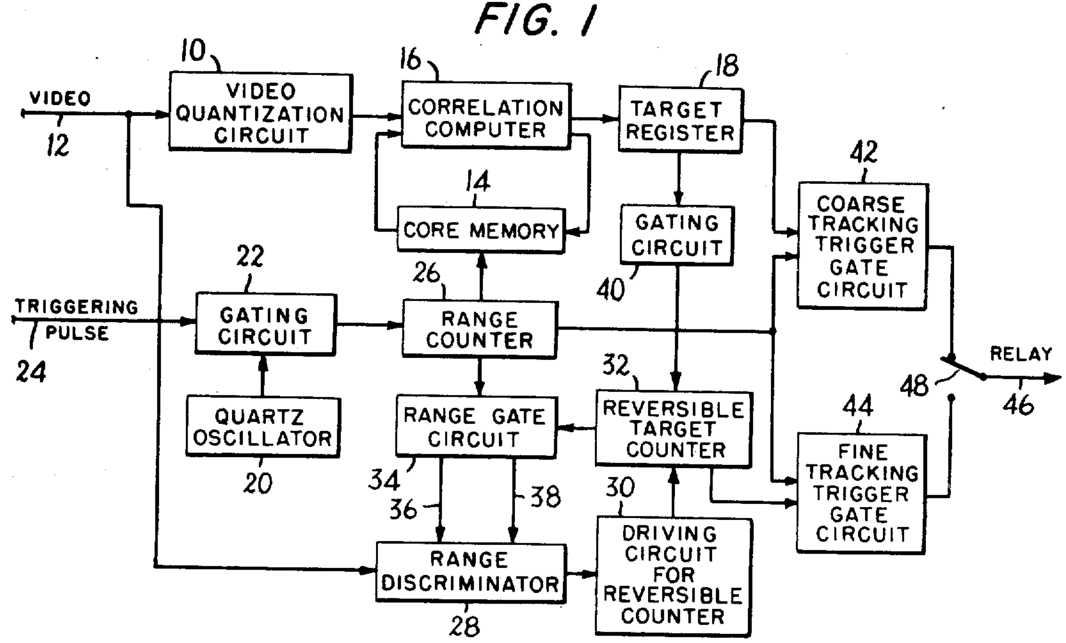
FIGURE 1 is a block diagram of a range tracking system constructed in accordance with the principles of the invention.

Referring now to the drawings and FIGURE 1 in particular, there is illustrated a range tracking system for use with an acquisition and tracking radar apparatus constructed in accordance with the principles of the invention. An arrangement illustrated comprises a video quantization circuit 10 for quantizing video information input 12 in a manner which will be described hereinafter, a magnetic memory 14 for storing a quantized information for the respective quantized ranges in a coverage of the associated radar apparatus (not shown), and a correlation computer circuit 16 for computing a correlation between the quantized range information signals applied thereto by both the quantization circuit 10 and the memory 14. The correlation computer circuit 16 applies the result of the correlation computation to the memory 14 and simultaneously applies to a target register 18 a range to the particular target of the radar apparatus which target has been determined to be present by the correlation computer circuit 16.

The arrangement further comprises a quartz oscillator 20 for providing clock pulses for the entire system, a gating circuit 22 connected to the quartz oscillator 20 and responsive to a triggering pulse 24 of a predetermined pulse recurrence frequency (PRF), applied thereto to pass the clock pulses from the oscillator 20 therethrough, and a range counter 26 connected to the gating circuit 22 to indicate a range to a target in the digital manner. The range counter 26 supplies an output to the memory 14.

A range discriminator circuit 28 has one input having applied thereto the video information input 12 to produce an error signal between a measured range to the particular target being tracked by the radar apparatus and the actual range thereto. The range discriminator circuit 28 is connected to a driving circuit 30 for producing a train of pulses having a density proportional to the error signal. The train of pulses is applied to a reversible target counter 32 to indicate the range to the target.

The reversible target counter 32 supplies a range signal for a target to a range gate circuit 34 which also receives an actual range signal for the same target from the range counter 26 to selectively produce a leading and a lagging range gate 36 and 38 respectively in the manner as will be described hereinafter. The leading and lagging range gates 36 and 38 then are applied to the range discriminator 28. Thus it will be appreciated that the range discriminator circuit 28, the driving circuit 30, the reversible target counter 32 and the range gate circuit 34 form a feedback loop. The reversible target counter 32 has also a range to a target transferred from the target register 18 thereto through a gating circuit 40.

A pair of coarse and fine tracking gate circuits 42 and 44 respond to target range signals from the target register 18 and the reversible target counter 32 respectively to provide coarse and fine tracking gates 46 which are, in turn, selectively applied to an angle tracking system (not shown). Both gate circuits 42 and 44 have an input connected to the range counter 26. As shown in FIGURE 1, a transfer relay 48 includes an armature normally engaging one of its two contacts connected to the output of the coarse tracking gate circuit 42. As the reversible target counter 32 begins to be operated, the armature of the relay 48 is adapted to engage that contact thereof connected to the output of the fine tracking gate circuit 44. Thus it will be appreciated that the coarse tracking gate 46 from the circuit 42 is normally applied to the angle tracking system whereas after the reversible target counter 32 has been operated the fine tracking gate 46 from the circuit 44 is applied to the angle tracking system.

Figure 2:
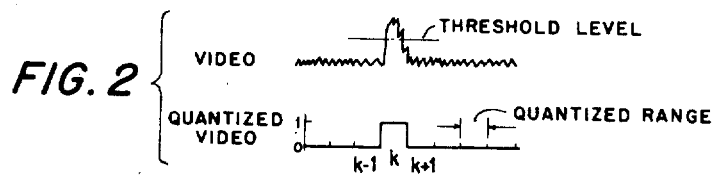
FIGURE 2 is a graph useful in explaining the video quantization according to the principles of the invention.

The arrangement thus far described is operated at follows: The video signal 12 is applied to the quantization circuit 10 to be quantized as shown in FIGURE 2 wherein the video signal 12 is shown on the upper portion and the quantized signal is shown on the lower portion with the axis of ordinates represents a time base expressed in terms of quantized range to a target. Specifically the quantization circuit 10 has a threshold level as shown in horizontal line in FIGURE 2 and that portion of the signal exceeding the threshold level provides an output "ONE" while that portion thereof below the threshold level provides an output "ZERO." For example, the video signal 12 includes one echo exceeding the threshold level and that echo provides an output "ONE" at a position corresponding to the $k^{th}$ quantized range. In the other words, the video signals 12 is quantized so as to form "ON" and "OFF" signals. It is to be noted that the video signal is quantized in both amplitude and a range (that is, a time). After the video signal has been quantized in this way, the echoes from the particular target can be expressed in the form of squares arranged in a chessboard as shown in FIGURE 3 wherein the axis of abscissas represents a quantized range and the axis of ordinates represents the pulse recurrence frequency (PRF) of the associated radar pulses.

From FIGURE 3 it will be seen that the echoes have such a time relationship that for a first one of the recurrent radar pulses echoes are developed in the order of $1_s$, $2_s$, $3_s$, . . . $m_s$, for a second pulse they continue in the order of $1_r$, $2_r$, $3_r$, . . . $m_r$ and so on. The echoes from a target to be sought will be developed in those squares having the symbol "circle" on the chessboard. The symbol "circle" means that the output from the quantization circuit 10 is of "ONE." Therefore it will be appreciated that by determining a correlation between the echoes, the echoes from the desired target can readily be distinguished from the noises sporadically occurring. More specifically, assuming that one of the recurrent radar pulses starts at a time point $n$ and that the memory 14 has progressively stored therein the preceding echoes corresponding to the preceding radar pulses starting at time points $n-1$, $n-2$, . . . $n-p$ respectively and resulting from the respective quantized ranges, the correlation computer circuit 16 can compute a correlation between $(p+1)$ data resulting from $n$ radar pulses at the time points $n-1$, $n-2$, . . . $n-p$ plus data resulting from the radar pulse at the time point $n$ quantized by the quantization circuit 10. Under these circumstances, if the correlation computer circuit 16 is adapted to determine the presence of a target when at least $g$ data among these $p+1$ data where $1<g<p+1$ equal "ONE's," then the target can readily be detected. In other words, the correlation computer circuit 16 is arranged to accomplish a computation by which the presence of a target is determined when at least $g$ data among data $k_n$, $k_{n-1}$, . . . $k_{n-p}$ at the $n^{th}$ time point and data $k_{n+1}$, $k_n$, . . . $k_{n+1-p}$ at the $n+1^{th}$ time point with respect to a quantized range $k$ for example, provide ONE outputs, for the respective quantized ranges, 1, 2, . . . $k$, . . . $m$ in a completely controlled time whereby whether or not the range information for the target will be useful can be judged without any time delay.

The range information for the target thus obtained is immediately fed into the target register 18.

Since the range counter 26 begins to count the clock pulses from the oscillator 20 following each a PRF triggering pulse 24 to indicate a range to a target at each instant, a reference signal for gate synchronization is provided for an address counter (not shown) for the memory 14, the range gate circuit 34 and the tracking gate circuits 42 and 44.

The reversible target counter 32 corresponds in operation to a servo system for a resolver as will be described hereinafter and serves to cause a range indicated thereby to follow such a valve that the range error signal provided by the range discriminator circuit 28 becomes null.

In summary, the system is operated in the following sequence: The correlation computer circuit and memory, 16 and 14 respectively, first detect a target and then a range information for that target enters the target register 18. This causes the tracking gate circuit 42 to provide a tracking gate about the measured range to the target to initiate an angle tracking operation to be performed. At the same time, a range information for the target from the target register 18 is set in the reversible target counter 32 through the gating circuit 40 while the feedback loop 28, 30, 32 and 34 is operated to detect the range to the target with a high accuracy until a range error from the range discriminator 28 converges into the null value. This causes the transfer relay 48 to be switched to engage its armature with the lower contact (as viewed in FIGURE 1) connected to the fine tracking gate circuit 44 resulting in the formation of a more accurate tracking gate. Thereafter this tracking gate is utilized to perform the angle tracking operation.

If desired, an external signal for appointing any desired zone of ranges may be applied to the memory 14 in order to detect any target in that zone of ranges.

FIGURE 4 shows a modification of the invention wherein the feedback loop 28, 30, 32 and 34 is substituted with a servo system for a resolver. In FIGURE 4 the range discriminator circuit 28 as previously described in conjunction with FIGURE 1 is connected to a range servo-amplifier 50 supplying a servo-motor 52 and the range gate circuit 34, as previously described in conjunction with FIGURE 1, is controlled by a circuit 54 for producing a range triggering pulse. The circuit 54 is controlled by a resolver 56 which is, in turn, mechanically connected to the servo-motor 52.

The arrangement illustrated in FIGURE 4 is operated on the basis of the principles which will be subsequently described in conjunction with FIGURE 5. A seeking signal 58 is applied to the servo-amplifier 50 and a reference frequency signal designated at solid waveform 60 in FIGURE 5 and having the frequency of the associated radar pulses is applied to the resolver 56 where it is subject to a phase shift corresponding to a range to a target being sought to provide a signal having dotted waveform 62 shown in FIGURE 5 to form a range triggering pulse 64 (see FIGURE 5). As also shown in FIGURE 5, both waveforms 60 and 62 are utilized to form a triggering pulse 24 and the range triggering pulse 64. The triggering pulse 24 is applied to the gating circuit 22 as shown in FIGURE 1. If a fedback loop is formed to superimpose the range triggering pulse 64 on a range information for the target being sought then an angle of rotation exhibited by the resolver 56 corresponds to the range to the target.

An error between the range to the target and the range triggering pulses 64 therefor is detected by both the range gate circuit 34 and the range discriminator circuit 28. More specifically the range gate circuit 34 produces a leading and a lagging gate 36 and 38 respectively on both sides of the range triggering pulse 64. If that portion of the video signal 12 disposed in the gate width of the leading gate 36 is equal to that portion of the video signal 12 disposed in the gate width of the lagging gate 38 then the range discriminator circuit 28 provides an error signal of zero value. If the range gates lag with respect to the video signal 12 as shown in waveform (*a*) of FIG. 6 then that portion of the video signal disposed in the width of the leading gate 36 increases to provide an error signal tending to lead the range triggering pulse 64. On the contrary, if the range gates lead with respect to the video signal 12 as shown in waveform (*b*) of FIGURE 6, then that portion of the video signal disposed in the width of the lagging gate 38 increases to provide an error signal tending to lag the range triggering pulse 64. In this way the range servo system is operated to cause the angle of rotation of the resolver 56 to follow the range to the target.

The invention has several advantages. For example, since it can detect a range to a target from the associated radar apparatus without the necessity of sweeping and seeking the range, any interval of time required to effect an acquisition results in an instantaneous detection of a range. The use of digital circuits as a great part of the components permits not only the resulting equipment to be small-sized but also a digital transmission of various parameters of a target presently required in many application is easily accomplished.

What I claim is:

1. A range tracking system for use with an acquisition and tracking radar apparatus, comprising, in combination, a quantization circuit for quantizing video signals, a memory for storing therein said quantized signals originating from a predetermined zone of quantized ranges and throughout a predetermined width of a pulse recurrence frequency of radar pulses involved, a correlation computer circuit for computing a correlation between said stored signals to detect a range to an acquired target of the radar apparatus, and a tracking gate circuit responsive to said detected range to produce a tracking gate required to perform an angle tracking operation.

2. A range tracking system for use with an acquisition and tracking radar apparatus, comprising, in combination, a quantization for quantizing video signals, a memory circuit for storing therein said quantized signals originating from a predetermined zone of quantized ranges and throughout a predetermined width of a pulse recurrence frequency of radar pulses involved, and a correlation computer circuit for computing a correlation between said stored signals to detect a range to a target of the radar apparatus, a tracking gate circuit responsive to said detected range to produce a tracking gate required to perform an angle tracking operation, and a range of feedback system including a range discriminator circuit to correct an error between said detected range and an actual range to the target, the range to the target provided by said correlation computer circuit being applied to said range feedback system to perform a range tracking operation.

3. A range tracking system as claimed in claim 2, wherein said range feedback system comprises an addition to said range discriminator circuit for producing said range error signals, a driving circuit for producing a train of pulses having a density proportional to the range error signal, a reversible counter driven by said driving circuit to indicate the range to the target, and a range gate circuit responsive to a range triggering pulse from said reversible counter to provide a leading signal and a lagging signal for said range discriminator circuit.

4. A range tracking system as claimed in claim 2, wherein said range feedback system comprises, in addition to said range discriminator circuit for producing said range error signal, a servo-motor for effecting a rotation proportional to the range error signal, a resolver for shifting a phase of a reference frequency signal in accordance with the rotation of said servo-motor, a range trigger generator circuit responsive to a phase shifted signal from said resolver to generate a range triggering pulse corresponding to the range to the target, and a range gate circuit responsive to said range triggering pulse to provide a leading signal and a lagging signal for said range discriminator circuit.

References Cited

UNITED STATES PATENTS

| | | | |
|---|---|---|---|
| 3,141,163 | 7/1964 | Parode et al. | 343—7.3 |
| 3,353,177 | 11/1967 | Wilmot. | |

RODNEY D. BENNETT, Jr., Primary Examiner

T. H. TUBBESING, Assistant Examiner

U.S. Cl. X.R.

343—5